Figure 1:
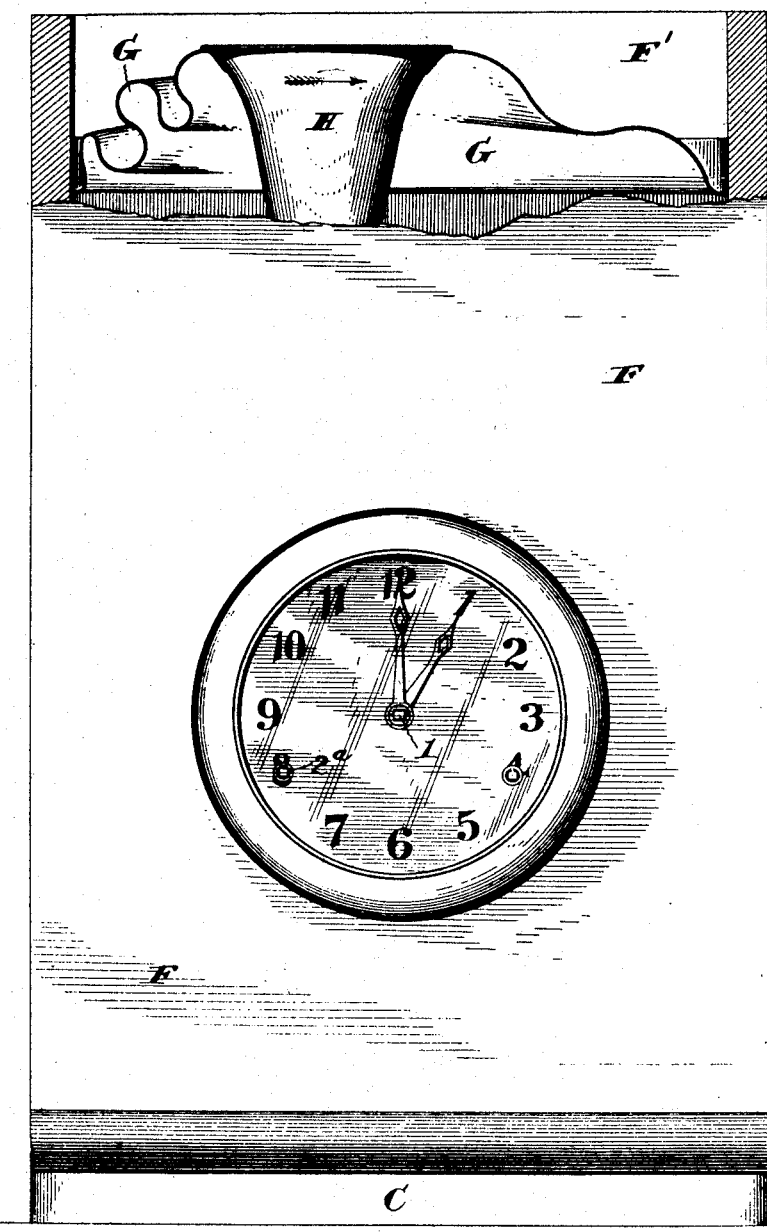

No. 883,111. PATENTED MAR. 24, 1908.
C. W. HENRICH.
GRAPHOPHONE CLOCK.
APPLICATION FILED JAN. 23, 1905.

6 SHEETS—SHEET 1.

Witnesses: Inventor:
Jas. E. Hutchinson. Christian W. Henrich,
Calvin T. Milans, By Milans Attorneys:

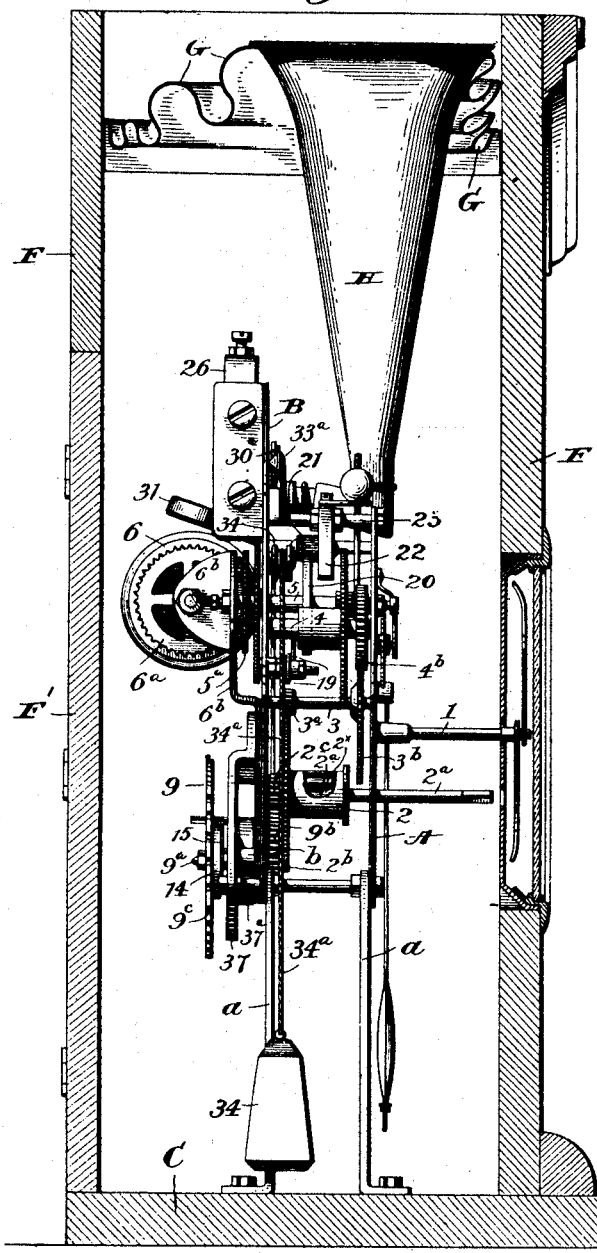

No. 883,111. PATENTED MAR. 24, 1908.
C. W. HENRICH.
GRAPHOPHONE CLOCK.
APPLICATION FILED JAN. 23, 1905.
6 SHEETS—SHEET 3.
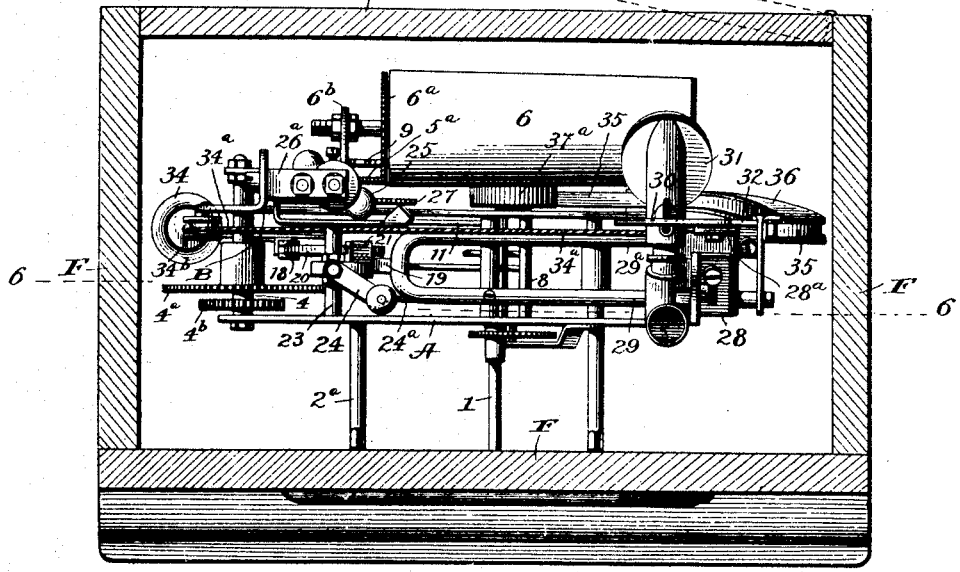
Witnesses:
Jas. E. Hutchinson.
Calvin T. Milans,
Inventor:
Christian W. Henrich,
By Milans Attorneys

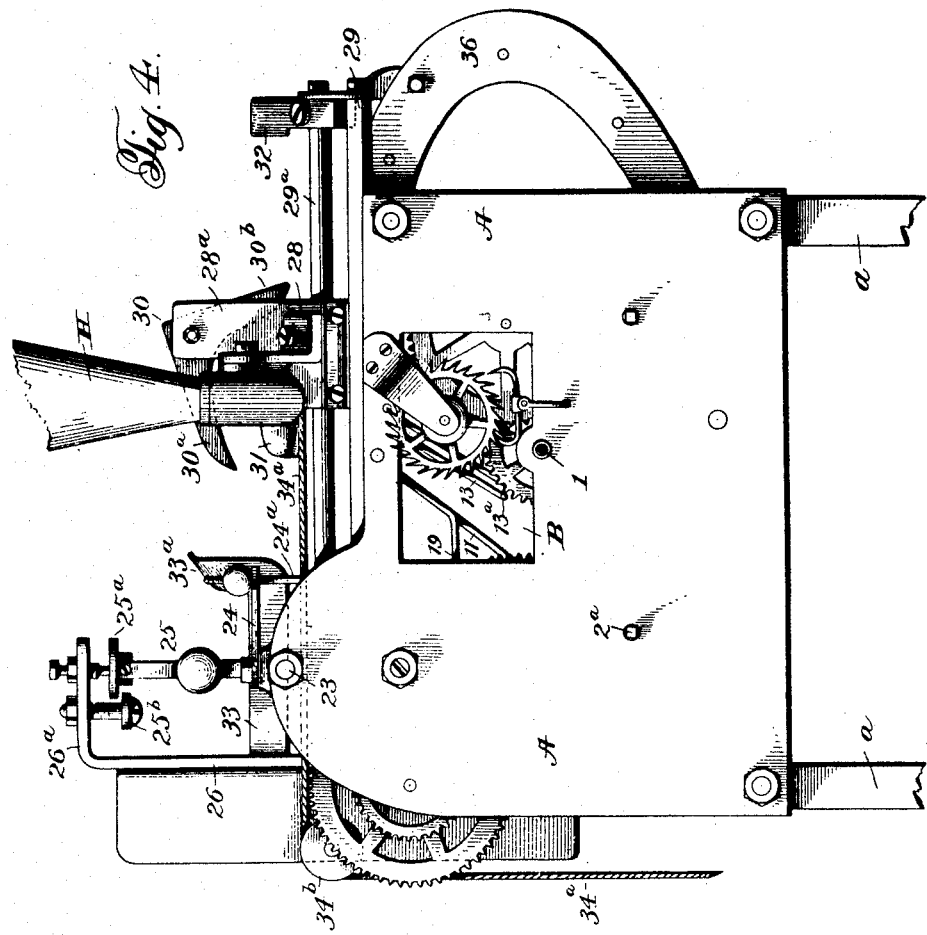

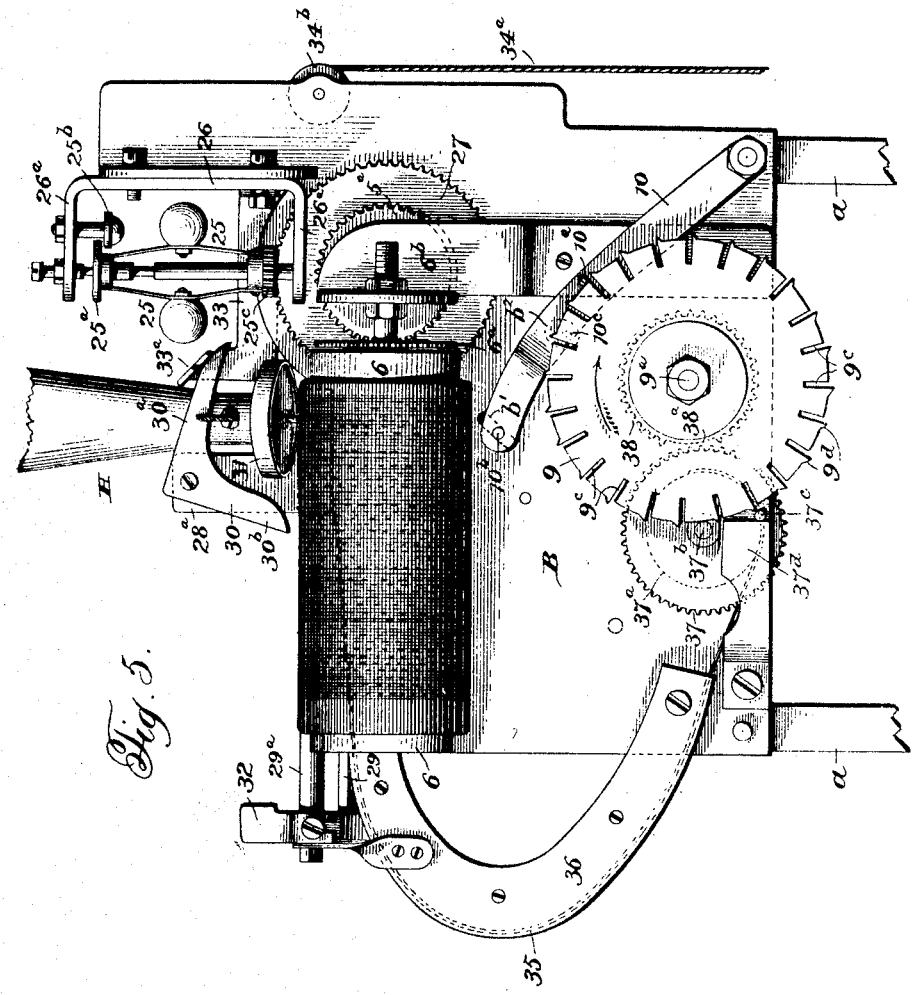

No. 883,111. PATENTED MAR. 24, 1908.
C. W. HENRICH.
GRAPHOPHONE CLOCK.
APPLICATION FILED JAN. 23, 1905.
6 SHEETS—SHEET 6.
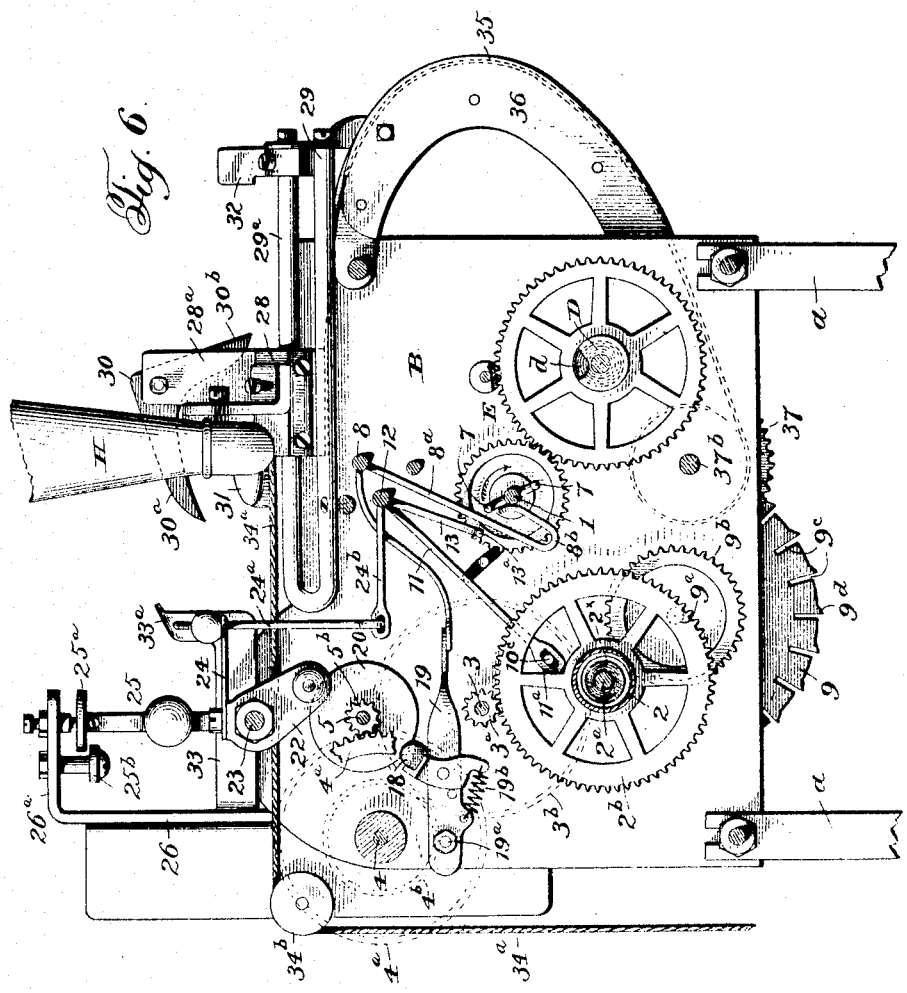

UNITED STATES PATENT OFFICE.

CHRISTIAN W. HENRICH, OF DETROIT, MICHIGAN, ASSIGNOR OF ONE-THIRD TO CHARLES H. BREDIN AND ONE-THIRD TO HUGH E. KENNY, OF DETROIT, MICHIGAN.

GRAPHOPHONE-CLOCK.

No. 883,111.

Specification of Letters Patent. Patented March 24, 1908.

Application filed January 23, 1905. Serial No. 242,350.

*To all whom it may concern:*

Be it known that I, CHRISTIAN W. HENRICH, a citizen of the United States, residing at Detroit, in the county of Wayne and State of Michigan, have invented certain new and useful Improvements in Graphophone-Clocks, of which the following is a specification, reference being had therein to the accompanying drawing.

This invention relates to improvements in combined clocks and talking machines and has for its main object the provision of simple and efficient means operatively associated with the clock mechanism for intermittently operating the talking machine at each hour, or fraction thereof, as desired, whereby the intervals of time or other information, will be announced automatically.

Novel characteristics of the invention reside in the provision of instrumentalities whereby the various parts of the phonograph, graphophone or the like, as the case may be, are controlled and directly actuated by the clock mechanism, thus obviating the necessity of a separate operating means for the talking machine, as now commonly employed.

The invention also comprehends improved means for causing the traveling reproducer of the talking machine to automatically return to its initial position with respect to the record cylinder after having completed its course along the length of the latter, thus providing for the repetition of the record continuously until the running down of the clock mechanism.

Many novel details in the construction and arrangement of the several parts of the machine will be apparent from the detailed description hereinafter, when read in connection with the accompanying drawings, forming part hereof, and wherein a preferable embodiment of the invention is illustrated.

In the drawings, Figure 1 is a front elevation of the clock, with the talking machine attached thereto, and the inclosing casing therefor broken away to show the covering; Fig. 2, is an end elevation of the device, the inclosing casing being shown in section; Fig. 3 is a plan view, with the inclosing casing shown in section; Figs. 4 and 5 are enlarged views, showing the device in front and rear elevation, the mechanism being removed from the casing; Fig. 6, is a sectional view on the line 6—6 of Fig. 3; Fig. 7 is a detail view, illustrating the locking disk in section, and Fig. 8 is a detail view of the mutilated gear.

In the drawings I have conveniently illustrated a well known clock mechanism, comprising a driving and striking train.

Referring now more particularly to the drawings, wherein like reference characters designate corresponding parts throughout the several views, A and B designate respectively front and back plates of a suitable frame mounted upon supports $a$ secured to a platform C.

D is an ordinary main spring barrel of a clock having operatively associated therewith, through the instrumentality of suitable gearing E, a hand shaft 1, all of which being mounted intermediate said plates A and B.

2 designates an auxiliary spring barrel, such as is commonly used for operating the striking mechanism of clocks, the said barrel 2 having a winding shaft $2^a$ projecting without the plate A, and a suitable spring, not shown. Springs $d$ and $2^\times$ of ordinary construction are provided for the barrels D and 2 respectively.

3, 4 and 5 respectively designate shafts extending between the plates A and B, and mounted for rotary movement. A gear $2^b$ is mounted upon the barrel 2 and meshes with a pinion $3^a$ on the shaft 3, the latter also having mounted thereon a gear $3^b$ meshing with a pinion $4^b$ on the shaft 4.

$4^a$ designates a gear on said shaft 4 meshing with a pinion $5^b$ on the shaft 5, the latter projecting without the plate B and having a terminal gear $5^a$ engaging peripheral gear teeth $6^a$ upon the record cylinder 6, mounted upon the bracket $6^b$ on the plate B. From the description thus far set forth, it will be seen that the record cylinder 6 is operated directly from the barrel 2, means being provided, however, for rendering said parts inoperative except at predetermined intervals, and said means preferably comprising the following parts.

One or more cams 7 (according to the length of the interval desired between the operations of the talking machine) are secured upon the hand shaft 1, and arranged to project downwardly into the path thereof is the hooked end $8^b$ of an arm $8^a$ mounted upon a rock shaft 8. 9 is a count wheel or locking disk arranged to the rear of the plate B, having a shaft $9^a$ passing loosely through a sleeve $b$ of said plate, and having at its inner end a gear $9^b$ meshing with a pinion $2^c$ upon the barrel 2, and movable therewith.

The disk 9 has a series of peripheral slots $9^c$ adapted for the reception of a dog $10^a$, normally engaging the periphery of the disk and extending downwardly from a rock arm 10, pivoted at one end to the frame B and guided at its opposite end, through the medium of a lug $10^b$ engaging a slot $b'$ in said plate B. Arranged intermediate the ends of the arm 10 is an inwardly projecting lug $10^c$, passing through a slot $b^2$ of the plate B and engaged by an apertured end $11^a$ of an arm 11, extending upwardly and rearwardly and connected to a rock shaft 12 mounted upon the frame, and carrying the downwardly extended member 13 having an offset end $13^a$ arranged in the path of the cam actuated arm $8^a$ to be actuated thereby to rock the shaft 12 and release the dog $10^a$ from the slots $9^c$ through the instrumentality of the arm 11, thus releasing the disk 9, and rendering the barrel 2 and its associated parts operative until the next adjacent slot of the disk is brought into registration with the dog $10^a$, when the latter will drop from the periphery of the disk into said slot, thereby locking the parts from further movement until again released by the mechanism above described.

In order to obviate the likelihood of the dog $10^a$ skipping past any of the slots $9^c$, without dropping into the same to be engaged thereby I provide upon the disk periphery, inclined lugs $9^d$, one adjacent each slot, to slightly raise the dog vertically in advance of its registration with the slot, and permitting it to drop from the knife edge of the lug directly into said slot. This slight vertical movement imparted to the dog just as it is about to engage the slot obviates the tendency of the same skipping the slot, as would be the case were the periphery continuous.

The disk 9 is also provided with means for preventing the dropping back of the dog into the slot from which it has just passed, said means preferably comprising an auxiliary disk 14 having an apertured hub portion $14^a$ passing loosely through a central aperture of the disk 9 and a tension spring 15 secured respectively at its ends to the auxiliary disk and to a lug 16 on the disk 9, the lug passing through a slot $9^e$ on said auxiliary disk. A collar 17 is sleeved upon the hub $14^a$ to the outside of the disk 9, and the hub has a screw-threaded engagement with the shaft $9^a$. The parts just described are so arranged as to give to the disk 9 a quick initial movement as soon as it has been released by the dog, such movement being limited by the length of the slot $9^e$.

In order to insure a gradual starting of the record cylinder I provide a brake shoe 18 on the elongated member 19, pivoted at $19^a$ to the plate B, said shoe adapted to exert a temporary yieldable pressure through the medium of the spring connection $19^b$, upon a brake wheel 20 mounted upon the shaft 5. The member 19 extends rearwardly and is connected with the rock shaft 8 so as to be reciprocated thereby. It is also desirable to secure a stoppage of the record cylinder simultaneous with that of the disk 9, the means employed comprising an auxiliary brake shoe 21 on a rocking plate 22 extending downward from a shaft 23, said shoe being adapted to periodically engage the wheel 20, through means of the connected rods 24, $24^a$ and $24^b$, the latter being secured to the rock shaft 12. It will thus be seen that as the disk 9 is released by the dog $10^a$, the brake 18 is automatically temporarily applied, and the brake 21 released by the movement of the rock shafts 8 and 12, respectively, and as the dog $10^a$ engages one of the slots $9^c$ of said disk the brake 21 will be simultaneously applied.

A suitable governor 25 is also provided for regulating the speed of the cylinder 6, the same being mounted intermediate the arms $26^a$ of the bracket 26, mounted on the frame in any desired manner. The governor carries at its upper end the brake disk $25^a$, adapted to engage the adjustable stop $25^b$ on the upper arm of the bracket 26, and mounted upon the lower end of said governor is a pinion $25^c$ meshing with a gear 27 on the shaft 5.

The reproducing mechanism preferably comprises a carriage 28 slidably mounted upon the shaft 29 and guided by the rod $29^a$, the rod and shaft being connected and mounted upon the frame in any desired manner. Extending forwardly from the carriage is a bracket $28^a$ having pivotally secured at its upper end a bell crank lever 30, the arm $30^a$ of which being pivotally secured in any suitable manner, as by a cord $31^a$ to the reproducer 31, and the latter being in turn connected to the usual horn attachment. At the rear end of the shaft 29 is an upwardly projecting arm 32, the same being outwardly extended adjacent its top and arranged in the path of the arm $30^b$ of the bell crank lever 30, whereby the latter is actuated when the reproducer reaches the end of its movement to raise the reproducer from engagement with the record cylinder. An inwardly extended arm 33 secured to the frame adjacent the forward end of the shaft 29 has an offset cam portion $33^a$ arranged in the path of, and adapted to be engaged by, the arm $30^a$ whereby the reproducer will be again lowered into operative relation to the record after the same has been returned to its initial position by the mechanism about to be described.

34 is a weight depending from a cord $34^a$ connected to the forward end of the carriage 28 and guided by the anti-friction bearing $34^b$, and 35 is an elongated spring member secured to the rear end of said carriage, the same traveling within a curved runway 36, secured to the plate B, and being connected to the hub $37^a$ of a gear 37 on a shaft $37^b$ mounted on the frame. The gear 37 is arranged to mesh with the gear 38 on the shaft $9^a$, said gear 38 having a mutilated portion $38^a$. The reproducer being in its initial position, the parts just described are so arranged that the gear train will wind the spring 35 about the hub $37^a$ and draw the carriage rearwardly until the reproducer is raised from contact with the record by the arm 32, at which time the mutilated portion of the gear 38 is in adjacence to the gear 37, thus allowing the latter to be moved in the reverse direction with the carriage 28, through the action of the weight 34. A stop $37^c$ on the gear 37 engages an abutment $37^b$ on the plate B for limiting such reverse movement. Upon being returned, the reproducer 31 will be again automatically lowered into operative position by the means before described.

The construction and arrangement of the several parts being as above detailed it is believed the operation is obvious. The spring barrels D and 2 being wound up, the clock mechanism continually operates, and through the instrumentality of the cams 7 upon the hand shaft 1 automatically operates at predetermined intervals the talking attachment, the latter being normally held inoperative by the locking disk 9 and its associated parts in connection with the brake shoe 21. Upon the disk and brake being released, the disk is given an automatic quick initial movement so that the slot from which the dog has just passed will be out of registration therewith, and the brake 21 temporarily applied to secure a slow, gradual starting movement to the record cylinder. The releasing means for the talking attachment is shown as operating at periods of every half hour, though this may of course be altered at will. Upon reaching the end of its movement relative to the record cylinder, the reproducer is automatically raised and the carriage returned to its initial position by the weight, the mutilated gear of the reproducer carrying train allowing of such return movement at the proper time.

A suitable inclosing casing F is provided, the front thereof being provided with the usual clock dial, and having apertures for the passage of the hand and winding shafts, a suitable door F' being also provided at the rear of the casing to afford access to the working parts of the machine. Upon the top of the casing F is mounted a covering G centrally apertured for the passage of the horn H, the said covering having a dust proof connection with said horn and being collapsible whereby the same may be expanded or folded in consonance with the corresponding shifting movements of said horn. It will thus be seen that the inclosing casing and covering render the several parts of the machine practically dust proof.

It is obvious that many minor changes in the details of the construction of my device may be made without in the least departing from the spirit of the invention.

Having thus described my invention what I claim as new and desire to secure by Letters Patent is:—

1. In combination with a talking machine having a record and support therefor, of a clock mechanism connected therewith, the clock mechanism comprising means for rendering the talking machine inoperative including a slotted disk in gear with said support, a dog adapted to engage said slots, and means for releasing said dog including a pivoted arm, and braking means operated by the clock mechanism for insuring a slow gradual start to the talking machine when released.

2. In combination with a talking machine including a record and support therefor, of a clock mechanism associated with the talking machine and comprising means for rendering the talking machine inoperative including a slotted disk mounted for rotary movement and in gear with said support, a dog adapted to engage said slots, means for releasing said dog including a pivoted arm therefor, a rock shaft for the arm, a hand shaft, cams on the hand shaft, and means arranged in the path of the cams for operating the rock shaft in combination with means operated by the cam for insuring a slow gradual start to the talking machine when released.

3. In combination with a talking machine, a clock mechanism connected directly therewith by a train of gearing, the said mechanism including a slotted disk on one of the gear shafts, and a locking member for engaging and disengaging said slots to actuate and release the talking machine, in combination with braking means operated by the clock mechanism for insuring a slow gradual start to the talking machine when released.

4. In combination with a talking machine, a clock mechanism for operating the latter comprising means for normally rendering the talking machine inoperative including a rotary disk having engaging portions and a dog adapted to contact with said engaging portions, releasing means for the dog, and means for exerting a quick limited movement to the disk when released.

5. In combination with a clock, of mechanism therefor, a talking machine connected therewith, the clock mechanism comprising means for normally rendering the talking machine inoperative, including a rotatable slotted disk, and a dog adapted to engage the slots therein, and releasing means for the dog, said disk adapted to automatically rotate out of registration with said slot by a quick initial limited movement.

6. In combination with a clock mechanism, of a talking attachment connected with the latter, the clock mechanism comprising means for normally rendering the talking attachment inoperative including a slotted disk and a dog adapted to engage the slots therein, releasing means for the dog, and resilient means for exerting a quick initial movement to the disk when released.

7. In combination with a clock mechanism, of a talking attachment, the clock mechanism comprising means for normally rendering the talking attachment inoperative including a slotted disk having peripheral lugs adjacent to each of said slots, and a dog adapted to engage said lugs and slots.

8. In combination with a clock, of a talking mechanism operated thereby including a record support, a brake disk for the latter, a brake, means for applying and releasing said brake, and means for temporarily resisting the movement of the support upon its release.

9. In combination with a talking machine having a record cylinder, of a clock mechanism therefor, a brake disk for the record cylinder, and a brake, the clock mechanism including means for positively locking the talking mechanism simultaneously with applying the brake to said disk.

10. In combination with a clock mechanism, of a talking mechanism, a brake disk for the latter, and a plurality of brakes alternately operable upon said disk by the clock mechanism.

11. In combination with a clock mechanism, of a talking attachment, a brake disk for the latter, and a brake shoe operable upon said disk, said clock mechanism comprising means for normally holding the talking attachment inoperative including a count wheel, and means for releasing the same, a hand shaft, and a cam on the shaft for actuating the brake shoe.

12. In combination with a talking attachment for clocks, the attachment including a rotatable record support, of clock mechanism for positively stopping the talking attachment, comprising a brake disk, and a brake shoe also actuated by the clock mechanism to engage said disk.

13. In combination with clock mechanism, of a talking mechanism, the latter having a locking disk and a brake wheel, and said clock mechanism including means for engaging said disk and wheel at predetermined intervals.

14. The combination of a talking attachment for clocks, talking mechanism including automatic means for rendering the attachment inoperative, means for releasing said last mentioned means, means for temporarily retarding the action of the talking attachment when released, and said last mentioned means being subsequently released.

15. The combination of a graphophone, a clock mechanism associated therewith, means for rendering the graphophone inoperative, means for releasing said last mentioned means, a braking means operated by the clock mechanism for insuring a slow gradual start to the graphophone, and a governor for regulating the speed of the talking attachment.

16. The combination of a clock, a talking attachment actuated thereby, the clock including means for rendering the talking attachment inoperable except at predetermined intervals comprising a positive locking disk and a brake disk, means for releasing said disks, and means for securing a slow gradual start to the attachment when so released.

17. In a clock, the combination with the driving train, and an alarm train, of a talking mechanism and connected mechanism actuated by the alarm train and governed by the driving train for positively actuating the talking mechanism at predetermined intervals, the talking mechanism including a record cylinder and reproducer, a gear train for actuating the reproducer, said train being actuated by said alarm train, and weight actuating means for automatically returning the reproducer to its original position after reaching the limit of its movement relative to the cylinder, whereby the record may be continuously repeated until the winding down of said mechanism.

18. In combination with a clock mechanism, of a phonograph operated by the latter to indicate at predetermined intervals, including a record cylinder and reproducer, a gear train for carrying the reproducer, said train being geared up with the clock mechanism, and weight actuating means for automatically returning the reproducer to its initial position after reaching the limit of its movement relative to the cylinder, whereby the record may be continuously repeated until the winding down of said mechanism, and means for releasing the gear train during the return movement of the reproducer.

19. In a combined graphophone and clock, the combination of a record cylinder and reproducer, a gear train for carrying the reproducer, said train being actuated by the clock mechanism, and weight actuating means for automatically returning the reproducer to its initial position after reaching the limit of its movement relative to the cylinder, said gear train having a mutilated gear for rendering the train inoperative and allowing of said return movement at the proper time.

20. In combination with a graphophone, of a clock having mechanism for operating the graphophone, and the graphophone having the usual horn projecting therefrom, an inclosing casing for the clock and graphophone, and a covering for the inclosing casing whereby the graphophone is concealed from view, said cover being centrally apertured for the passage of the horn, and being collapsible whereby the same may be expanded or folded in consonance with the corresponding shifting movements of said horn.

21. In combination with a talking machine, of clock mechanism therefor, including a rotary disk having engaging portions, and a dog adapted to contact with said engaging portions, releasing means for the dog, and means for preventing re-registration of the dog with said engaging portions after being released.

22. In a clock, a talking attachment, means for normally rendering the latter inoperative, including a slotted disk, a dog adapted to engage said slots, and means for preventing the skipping of said dog over any of said slots.

23. In a clock, a talking attachment, means for normally rendering the latter inoperative, including a slotted disk, a dog adapted to engage said slots, releasing means for the dog, means for preventing re-registration of the dog with said slots after being released, and means for preventing skipping of said dog over any of said slots.

24. In a graphophone clock, automatic means for rendering the graphophone inoperative, means for releasing said last mentioned means, positive means for insuring a slow gradual start to the graphophone when released, and supplemental means for regulating the speed of the graphophone during the remainder of its operation.

25. In a graphophone clock, means for rendering the graphophone inoperative, and means for releasing said last mentioned means, a braking means operated by the clock mechanism for insuring a slow gradual start to the graphophone, and a governor for regulating the speed of the graphophone.

26. In a talking clock, a train of gearing therefor, a count wheel on one of the gear shafts, and a locking member operated by the clock to actuate and release the count wheel, and means operable when the count wheel is released for exerting a quick limited movement to the wheel and for insuring a slow, gradual start to the talking mechanism.

27. In a graphophone clock, a brake for stopping the movement of the graphophone, an auxiliary brake for insuring a slow, gradual start to the graphophone when released, and means whereby said last mentioned brake will only operate during the initial movement of the graphophone.

In testimony whereof I affix my signature in presence of two witnesses.

CHRISTIAN W. HENRICH.

Witnesses:
　GEO. I. CLOUTIER,
　FREDK. L. FRASER.